H. W. NICHOLS.
CULTIVATOR.

No. 188,815. Patented March 27, 1877.

Witnesses:
P. C. Dieterich
Frank H. Duffy

Inventor:
Henry W. Nichols
Per: C. H. Watson & Co. Attorneys.

UNITED STATES PATENT OFFICE.

HENRY W. NICHOLS, OF NORTHFIELD, INDIANA.

IMPROVEMENT IN CULTIVATORS.

Specification forming part of Letters Patent No. 188,815, dated March 27, 1877; application filed January 20, 1877.

*To all whom it may concern:*

Be it known that I, HENRY W. NICHOLS, of Northfield, in the county of Boone and State of Indiana, have invented certain new and useful Improvements in Revolving Cultivator, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification.

My invention relates to that class of cultivators and pulverizers in which one or more series of revolving wheels are used; and it consists in the construction and arrangement of such revolving wheel, as will be hereinafter more fully set forth.

Figure 1:
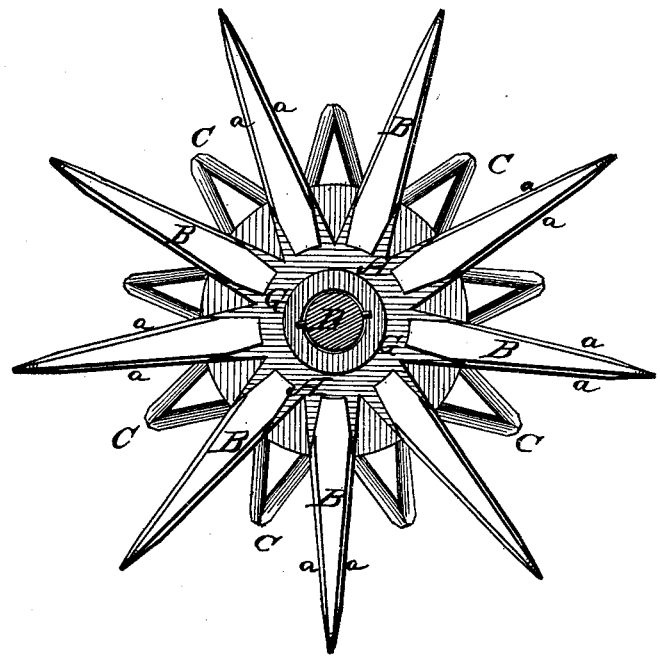
Figure 2:
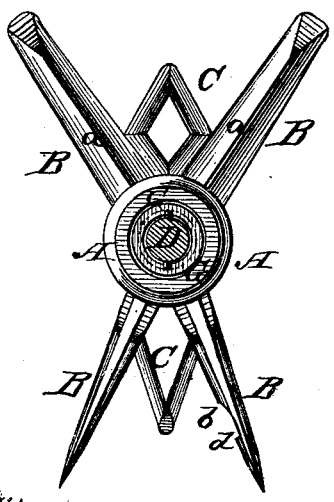
Figure 3:
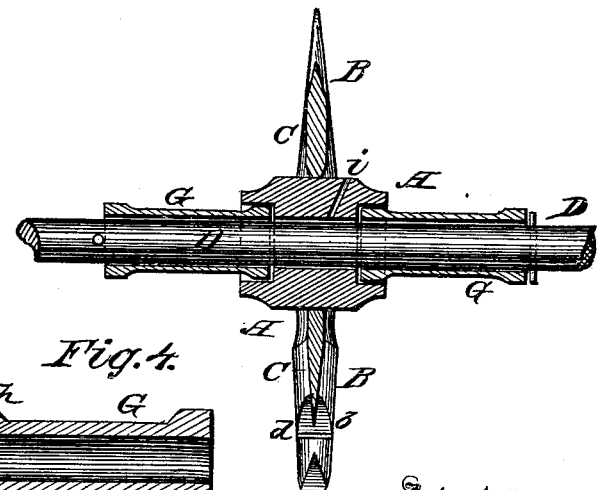
Figure 4:
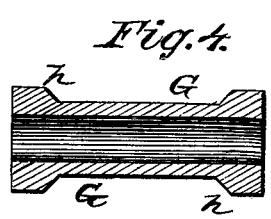

In the annexed drawing, which fully illustrates my invention, Figure 1 is a side view of my wheel. Fig. 2 is a side view, showing certain modifications of the same. Fig. 3 is a section of the wheel shown in Fig. 2, and Fig. 4 is a longitudinal section of a sleeve used with the wheel.

A represents the hub of the wheel, from which project alternate long teeth or spokes B B and short teeth or spokes C C, as shown. The short teeth or spokes C C are made in diamond shape, and set at right angles to the line of the hub, for the purpose of crushing and pulverizing any clods that may come in between the long spokes or teeth B. These long teeth or spokes are set with their broad sides parallel with the hub, and at right angles to the rim or circumference of the wheel, and they are made tapering, so that their extreme ends form cutting-edges, to better penetrate the ground, and also cut any weeds, stalks, &c., therein. These teeth are also made thicker in the center, forming ridges *a a* on the front and rear sides in the middle, whereby they are made stronger, and not liable to be broken off.

These teeth may, however, if desired, be set the same way as the short teeth—that is, at right angles with the hub.

The long spokes or teeth B may be made in prismatic shape, as shown in Fig. 2, and, in addition, a notch, *b*, may be made in the front side thereof, to form a cutting-edge at *d*, to better cut any grass, roots, weeds, &c.

This construction of the wheel possesses many and important advantages, among which are, that it will thoroughly cultivate and pulverize the ground, and cut all stalks, grass, weeds, &c., therein.

The hub A is placed upon a shaft, D, and in each end of the hub is formed a recess around the shaft, as shown in Fig. 3. Between the wheels on the shaft D are placed loose sleeves G G, the ends of which are enlarged, as shown at *h*, to fit in the recesses of the wheel-hubs. The hubs thus bear on the shaft in the center only, while at the ends they bear on the enlarged ends of the sleeves. In each hub is an oil-hole, *i*, as shown.

The wheels turn loosely on their shaft, and it is intended that the shaft shall turn in its bearings, so that in case any wheel should, by some means, be locked on the shaft, there will be no breakage, but the shaft and wheels will continue to revolve.

Having thus fully described my invention, what I claim as new, and desire to secure by Letters Patent, is—

In a revolving cultivator-wheel, the combination of two alternating series of long and short teeth or spokes, substantially as and for the purposes herein set forth.

In testimony that I claim the foregoing as my own I affix my signature in presence of two witnesses.

HENRY W. NICHOLS.

Witnesses:
MILTON H. BLAND,
DAVID T. EVERETT.